United States Patent [19]

Chen

[11] Patent Number: 5,333,078

[45] Date of Patent: Jul. 26, 1994

[54] DEVICE TO PERMIT USE OF A CAMERA VIDEO TAPE CASSETTE IN CONVENTIONAL VIDEO PLAYERS

[75] Inventor: Stephen Chen, Changhua, Taiwan

[73] Assignee: E Lead Electronic Co., Ltd., Changhua, Taiwan

[21] Appl. No.: 19,425

[22] Filed: Feb. 18, 1993

[51] Int. Cl.⁵ .................... G11B 23/00; G11B 15/665
[52] U.S. Cl. .................................... 360/94; 360/95
[58] Field of Search .............. 360/94, 95, 96.5; 242/200

[56] References Cited

U.S. PATENT DOCUMENTS

| | | | |
|---|---|---|---|
| 4,566,048 | 1/1986 | Tokunaga et al. | 360/94 |
| 4,994,929 | 2/1991 | Chen | 360/94 |

FOREIGN PATENT DOCUMENTS

| | | | |
|---|---|---|---|
| 58-53066 | 3/1983 | Japan | 360/94 |
| 58-114371 | 7/1983 | Japan | 360/94 |
| 58-212666 | 12/1983 | Japan | 360/94 |
| 58-212669 | 12/1983 | Japan | 360/94 |
| 58-212682 | 12/1983 | Japan | 360/94 |

Primary Examiner—John H. Wolff
Assistant Examiner—Craig A. Renner
Attorney, Agent, or Firm—Browdy and Neimark

[57] ABSTRACT

The invention is directed to a device to permit use of camera video tape in a conventional video player. The device has a port formed at a lower right end portion of a front side of a box body for a drive lever. The box body encloses a winding mechanism, left and right arm members, and left and right fixing seats. When the video tape is loaded in the box body, the drive lever can be pushed in to push the winding mechanism and swing the left and right arm members into an extension position where they are fixed by fixing seats to stretch the tape to permit operation in a video player.

2 Claims, 5 Drawing Sheets

DEVICE TO PERMIT USE OF A CAMERA VIDEO TAPE CASSETTE IN CONVENTIONAL VIDEO PLAYERS

BACKGROUND OF THE INVENTION

The present invention relates to a device to permit use of camera-used video tape in conventional video players.

A camera-used video tape is smaller than a general video tape so that the camera-used video tape is not compatible with a common video player and this causes great inconvenience to a user. Therefore, various video tape converters are developed to convert the camera-used video tape into a general video tape for common video player to play. In these video tape converters, the tape member of the video tape is stretched and located at a pre-determined position by a power unit for suitably cooperating with the playing head of the player. Such power unit such as a cell is contained in the converter itself so that a user must prepare a cell before using the converter. Moreover, the structure of the converter is relatively complicated and thus the manufacturing cost thereof is higher.

The same applicant's U.S. Pat. No. 4,994,929 discloses an automatic video tape converter to effectively solve the aforesaid problem. However, this video tape converter is still not totally satisfactory and should be improved.

SUMMARY OF THE INVENTION

It is therefore a primary object of this invention to provide an automatic video tape converter which is free from any additional power supplying unit and in which a drive lever is pushed when loading and unloading camera-used video tape so as to easily accomplish the conversion of the video tape.

According to the above object, a port is formed at a lower right end portion of a front side of the converter box body and a drive lever having a lateral rack section is slidably fitted in the port whereby when the video tape is loaded into the converter, the drive lever can be moved left or right to push a left and a right fixing seat pushing members which further drive a left and a right arm members to stretch the tape member of the video tape. When reaching a true position, the stretched tape member is located by a left and a right fixing seats to complete the conversion of the video tape. Reversely, when the video tape is unloaded from the converter, the drive lever is pulled outward to drive a winding mechanism so as to wind the tape member into the video tape and release the left and right arm members from the left and right fixing seats, restoring the left and right arm members to their home positions.

DETAILED DESCRIPTION OF THE PREFERRED EMBODIMENT

Figure 1:
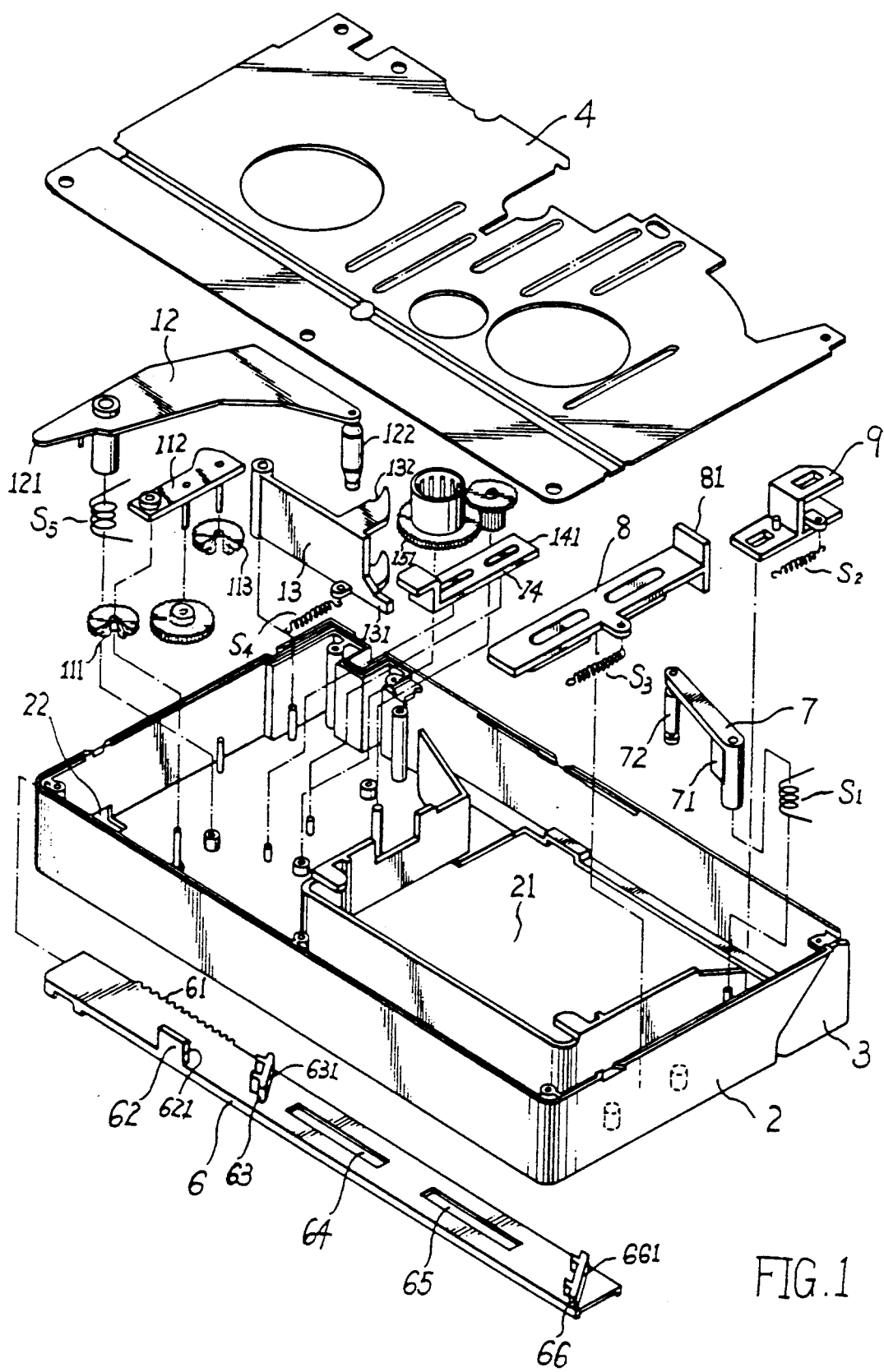
FIG. 1 is a rear perspective exploded view of this invention.
Figure 2:
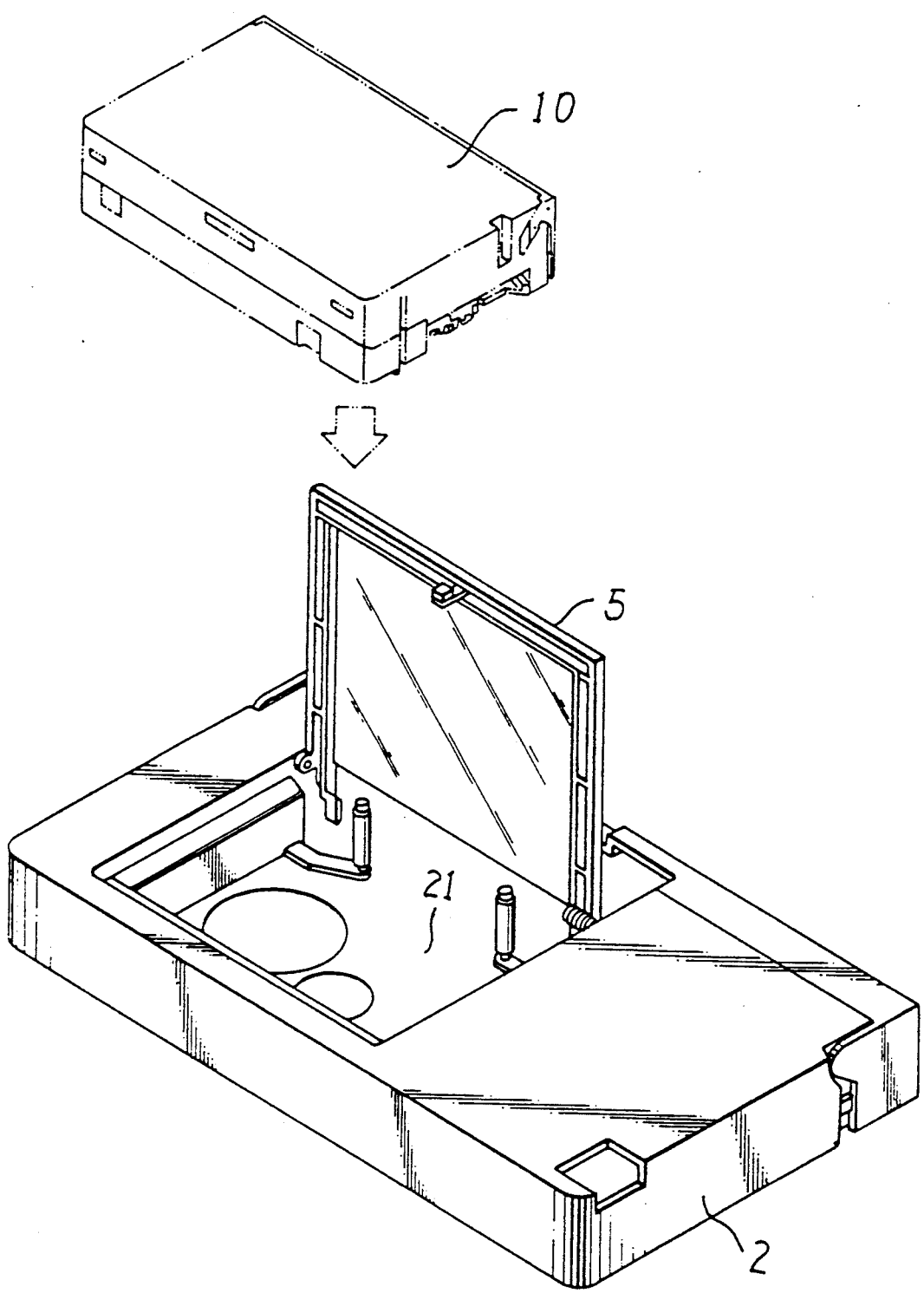
FIG. 2 is a front perspective assembled view thereof.
Figure 3:
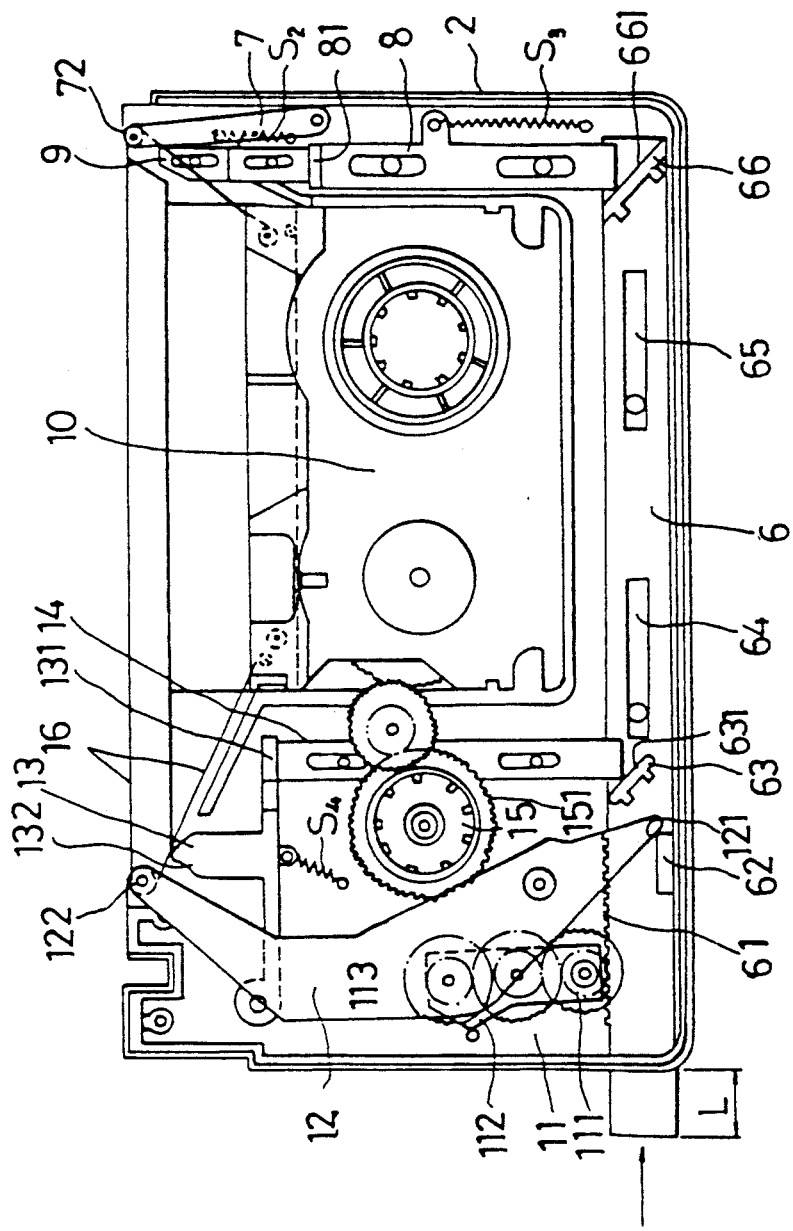
FIG. 3 shows the loading operation of this invention.
Figure 4:
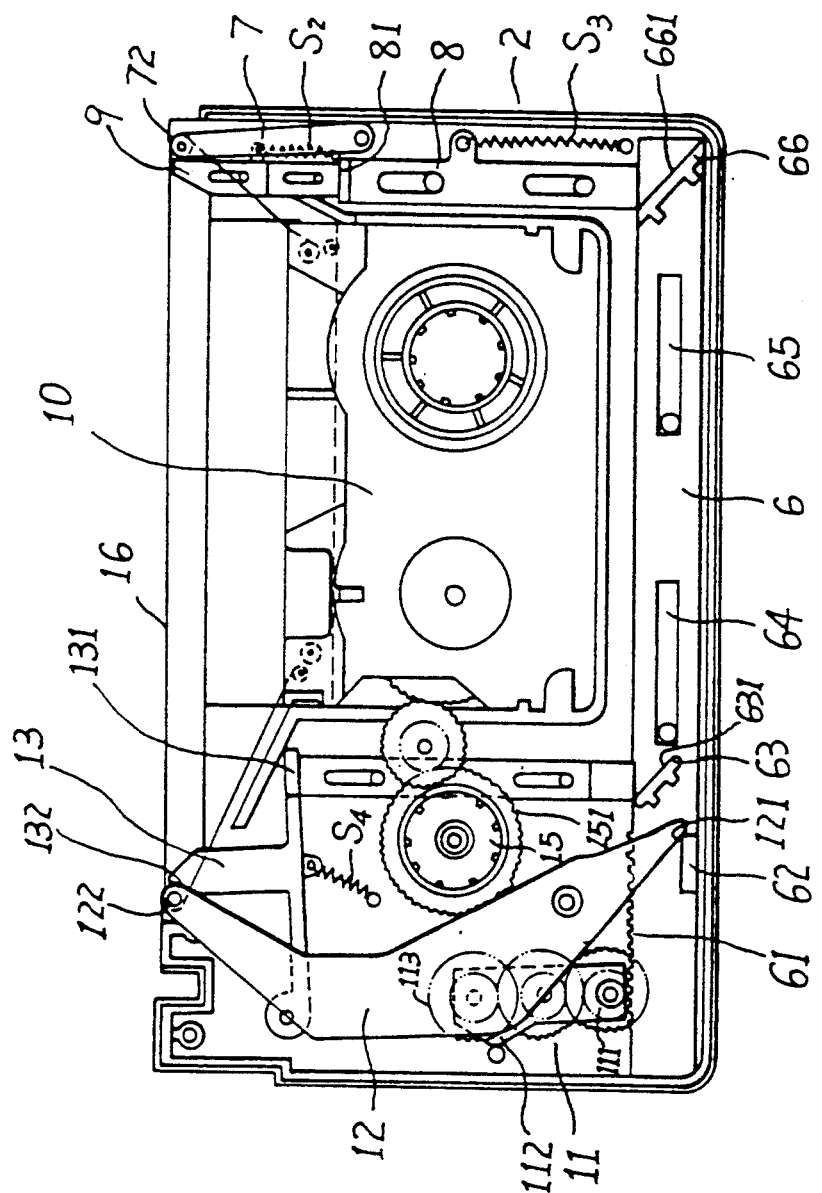
FIG. 4 shows the completion of the loading operation.
Figure 5:
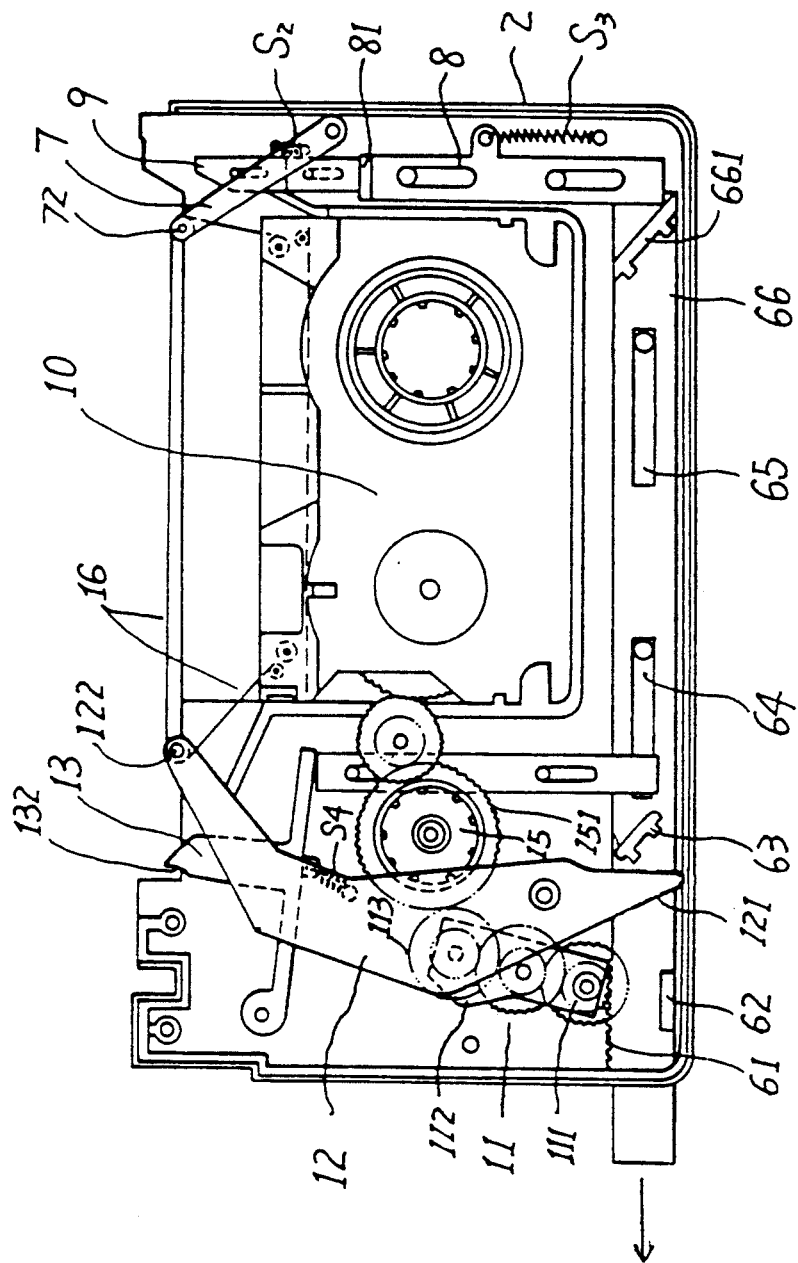
FIG. 5 shows the unloading operation of this invention.

Please refer to FIG. 1. The automatic video tape converter of this invention includes a box body 2, a top cover 3 pivotably connected to the box body 2 and a back cover 4 secured to a back side of the box body 2. An opening 21 is formed on a front side of the box body 2 for a camera-used video tape 10 to insert into the box body 2. A front cover 5 is pivotably associated with the front side of the box body 2 to close the opening 21 as shown in FIG. 2. A port 22 is formed at a lower right end portion of the front side of box body 2 whereby a drive lever is slidably fitted in the port 22. The drive lever 6 is formed with a left and a right slant pushing blocks 66, 63, two restricting slots 64, 65, a right arm member pushing block 62 and a lateral rack section 61, whereby when the video tape 10 is loaded into the box body 2, as shown in FIG. 3, the drive lever 6 which protrudes outside the box body 2 by a length L is pushed inward. As a result, a slant face 661 of the left slant pushing block 66 upward pushes a left fixing seat pushing plate 8. A front edge 81 of the pushing plate 8 then pushes a push face 71 of a left arm member 7 to rotate the left arm member 7, so that the tape member 16 is stretched to a stretching position through a shaft rod 72 of the left arm member 7. Simultaneously, a right side of the right arm member pushing block 62 of the drive lever 6 abuts against a rear end 121 of the right arm member 12 and by means of the transverse displacement of the drive lever 6 rotates the right arm member 12. A shaft rod 122 of the right arm member 12 and the shaft rod 72 of the left arm member 7 synchronously stretch the tape member 16 to the stretching position. The rack section 61 meshes with a pinion 111 of a gear set 11, whereby when the drive lever 6 is pushed inward, the pinion 111 meshing with the rack section 61 is rotated to drive the gear set 11 which is pivoted to the pinion 111 by a swinging lever 112. As a consequence, the gear set 11 is swung left about the shaft of the pinion 111 so as to make a gear 113 normally meshing with a drive gear 151 of a winding mechanism 15 to separate from the drive gear 151. When the tape member 16 is stretched to a fixed position by the left and right arm members 7, 12, the drive lever 6 is further pushed inward as shown in FIG. 4 so that the left slant pushing block 66 thereof further upward pushes the left fixing seat pushing plate 8. As a result, the front edge 81 thereof slips over the pushing face 71 of the left arm member 7 to push a left fixing seat 9 and fix the left arm member 7. Similarly, a slant face 631 of the right slant pushing block 63 synchronously upward pushes the right fixing seat pushing plate 14 so that a front edge 141 thereof pushes a front section 131 of the right fixing seat 13 and rotates the same. A pair of fixing claws 132, 132 are formed on a rear side of the right fixing seat 13 for fixing the right arm member 12 and completing the stretching of the tape member. When the tape member 16 is to be restored to its home position, the drive lever 6 is reversely pulled outward as shown in FIG. 5. At this time, the left and right arm members 7, 12 are biased back by torque springs S1, S2, S3, S4 and S5. Moreover, the gear set 11 is swung right by rack 61 to engage with the drive gear 151 of the winding mechanism 15 to completely restore the tape member 16 to an unstretched position.

What is claimed is:

1. A device to permit use of a camera-used video tape cassette in a conventional video player, said device comprising:
   a box body (2),
   a front cover (5) pivotably connected to a front side of said box body (2),
   a back cover (4) secured to a back side of said box body (2),
   a drive lever (6),
   a left fixing seat (9) slidably mounted in said box body and a right fixing seat (13) rotatably mounted in said box body,
   said left-fixing seat (9) and said right fixing seat (13) being spaced apart from said drive lever (6),
   a left arm member (7) and a right arm member (12) rotatably mounted in said box body,
   a left fixing seat pushing plate (8) and a right fixing seat pushing plate (14) slidably mounted in said box body,
   a winding mechanism (15) mounted in said box body,
   a gear set rotatably mounted on a gear lever (112), said gear lever rotatably engaged to said drive lever and selectively engaged to said winding mechanism (15),
   said drive lever (6) being slidably engaged in a port (22) extending through a lower right end portion of a front side of said box body (2),
   said drive lever having a left slant pushing block (66), a right slant pushing block (63), a right arm pushing block (62) and a lateral rack section (61),
   such that as said camera-used video tape cassette is loaded into said box body and said drive lever (6) is pushed inward, and drive lever (6) simultaneously causes:
   1) said left-slant pushing block (66) to push said left fixing seat pushing plate (8) to rotate said left arm member (7) into an extension position and to push said left fixing seat (9) to fix said left arm member (7) into said extension position,
   2) said right arm pushing block (62) to rotate said right arm member (12) into an extension position,
   3) said right slant pushing block (63) to push said right fixing seat pushing plate (14) to rotate said right fixing seat (13) to fix said right arm member (12) into said extension position, and
   4) said lateral rack section (61) to rotate said gear lever (112) out of engagement with said winding mechanism (15),
   wherein, as said right arm member (12) and said left arm member (7) are each in said extension position, a tape of said camera-used video tape cassette is in a stretched position ready for use in a conventional video player.

2. The device according to claim 1, wherein as said drive lever is pulled outward, spring members return said left fixing seat (9), said right fixing seat (13), said left arm member (7), said right arm member (12), said left fixing seat pushing plate (8), said right fixing seat pushing plate (14) and said gear lever (112) back to a starting position and restores said tape to an unstretched position.

* * * * *